(12) United States Patent
Erhard et al.

(10) Patent No.: US 12,111,111 B2
(45) Date of Patent: Oct. 8, 2024

(54) METHOD OF DRAINING AND FILLING MULTI-PASS HEAT EXCHANGER

(71) Applicant: Guntner GmbH & Co. KG, Furstenfeldbruck (DE)

(72) Inventors: Alfred Erhard, Achberg (DE); Hansjorg Brentrop, Oberhofen am Thunersee (CH)

(73) Assignee: Gunter GmbH & Co. KG, Furstenfeldbruck (DE)

( * ) Notice: Subject to any disclaimer, the term of this patent is extended or adjusted under 35 U.S.C. 154(b) by 325 days.

(21) Appl. No.: 17/502,231

(22) Filed: Oct. 15, 2021

(65) Prior Publication Data

US 2022/0136776 A1    May 5, 2022

Related U.S. Application Data

(63) Continuation of application No. PCT/EP2020/057986, filed on Mar. 23, 2020.

(30) Foreign Application Priority Data

Apr. 18, 2019   (DE) .......................... 102019110236.7

(51) Int. Cl.
  *F28D 1/00*   (2006.01)
  *F28D 1/02*   (2006.01)
  (Continued)

(52) U.S. Cl.
  CPC ......... *F28D 1/0417* (2013.01); *F28D 1/0233* (2013.01); *F28D 1/0426* (2013.01);
  (Continued)

(58) Field of Classification Search
  CPC .... F28D 1/0417; F28D 1/0233; F28D 1/0426; F28D 1/0443; F28D 1/05325;
  (Continued)

(56) References Cited

U.S. PATENT DOCUMENTS 2,891,773 A * 6/1959 Heller ...................... F28B 1/06
                                                            165/110
3,825,060 A * 7/1974 Heller ...................... F28B 1/00
                                                            137/520
(Continued)

FOREIGN PATENT DOCUMENTS

EP        1698847 A1    9/2006
EP        3306247 A1    4/2018
(Continued)

*Primary Examiner* — Travis Ruby
(74) *Attorney, Agent, or Firm* — Baker Botts. LLP

(57) ABSTRACT

The invention relates to a heat exchanger assembly with at least one multi-pass heat exchanger, comprising a first distributor (1) with a first connection part (1*a*) for connecting to a fluid line (9), a second distributor (2) with a second connection part (2*a*) for connecting to a fluid line (9), and at least one first deflection distributor (4), as well as a plurality of tube lines (5) through which a fluid, in particular water, can flow, wherein the first distributor (1) and the second distributor (2) are arranged at one end (A) of the heat exchanger assembly, the deflection distributor (4) is arranged at the opposite end (B) and the tube lines (5) extend from the one end (A) to the opposite end (B), and wherein the first connection part (1*a*) is arranged at a lowest point (T) or at least near to the lowest point (T) of the first distributor (1) and the second connection piece (2*a*) is arranged at a lowest point (T) or at least near to the lowest point (T) of the second distributor (2). In order to allow for the heat exchanger assembly to be quickly filled with the fluid and quickly emptied, a third connection part (3) is arranged on the first distributor (1) and/or on the second distributor (2) at a highest point (H) or at least near to the highest point (H) of the respective distributor (1 or 2), and at least one ventilation opening (10) is provided at a highest point (T) or at least near to the highest point (T) of the deflection (Continued)

distributor (4) for pressure equalisation with the environment.

13 Claims, 12 Drawing Sheets

(51) Int. Cl.
*F28D 1/04* (2006.01)
*F28D 1/053* (2006.01)
*F28F 27/02* (2006.01)

(52) U.S. Cl.
CPC ....... *F28D 1/0443* (2013.01); *F28D 1/05325* (2013.01); *F28D 1/05333* (2013.01); *F28D 1/05366* (2013.01); *F28F 27/02* (2013.01)

(58) Field of Classification Search
CPC ............. F28D 1/05333; F28D 1/05366; F28D 1/05341; F28F 27/02; F28F 17/00; F28F 2265/06; F28F 2265/22

See application file for complete search history.

(56) References Cited

U.S. PATENT DOCUMENTS

| 2013/0048245 A1* | 2/2013 | Schroeder | F22B 21/12 165/71 |
| 2016/0242326 A1* | 8/2016 | Edwards | F04D 25/16 |

FOREIGN PATENT DOCUMENTS

| KR | 101090226 B1 * | 12/2011 | F24F 1/00 |
| WO | WO 9015299 A1 | 12/1990 | |
| WO | WO 2018184908 A1 | 10/2018 | |
| WO | WO 2020/212090 A1 | 10/2020 | |

* cited by examiner

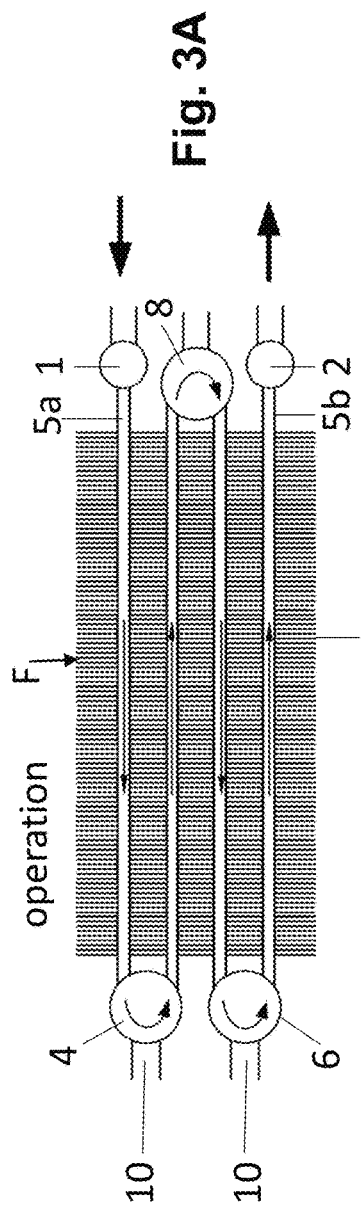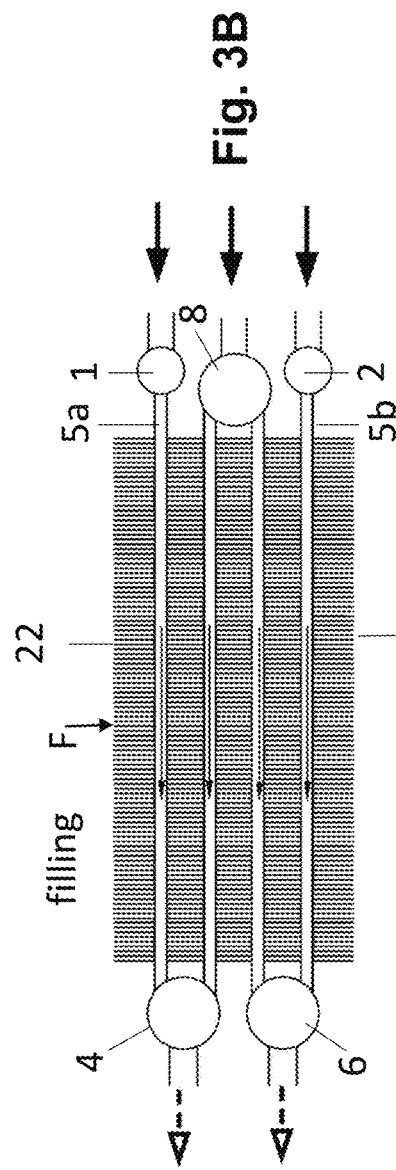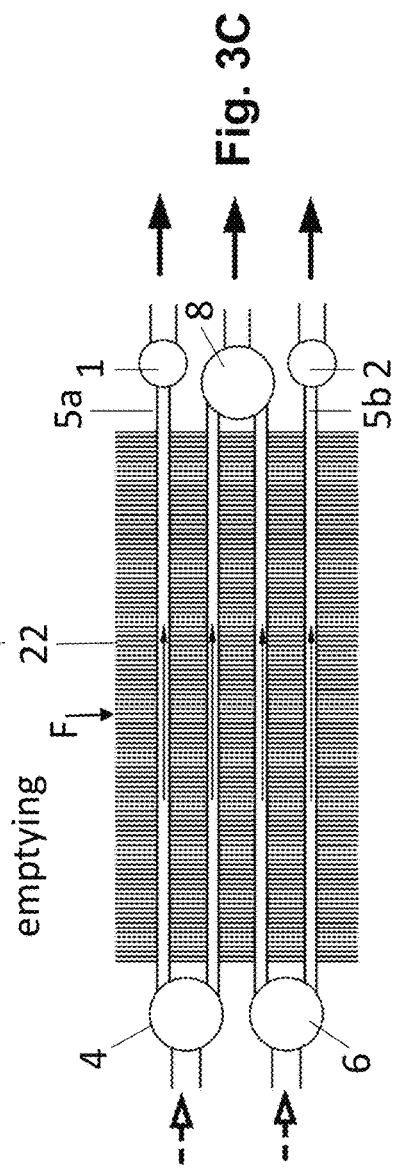

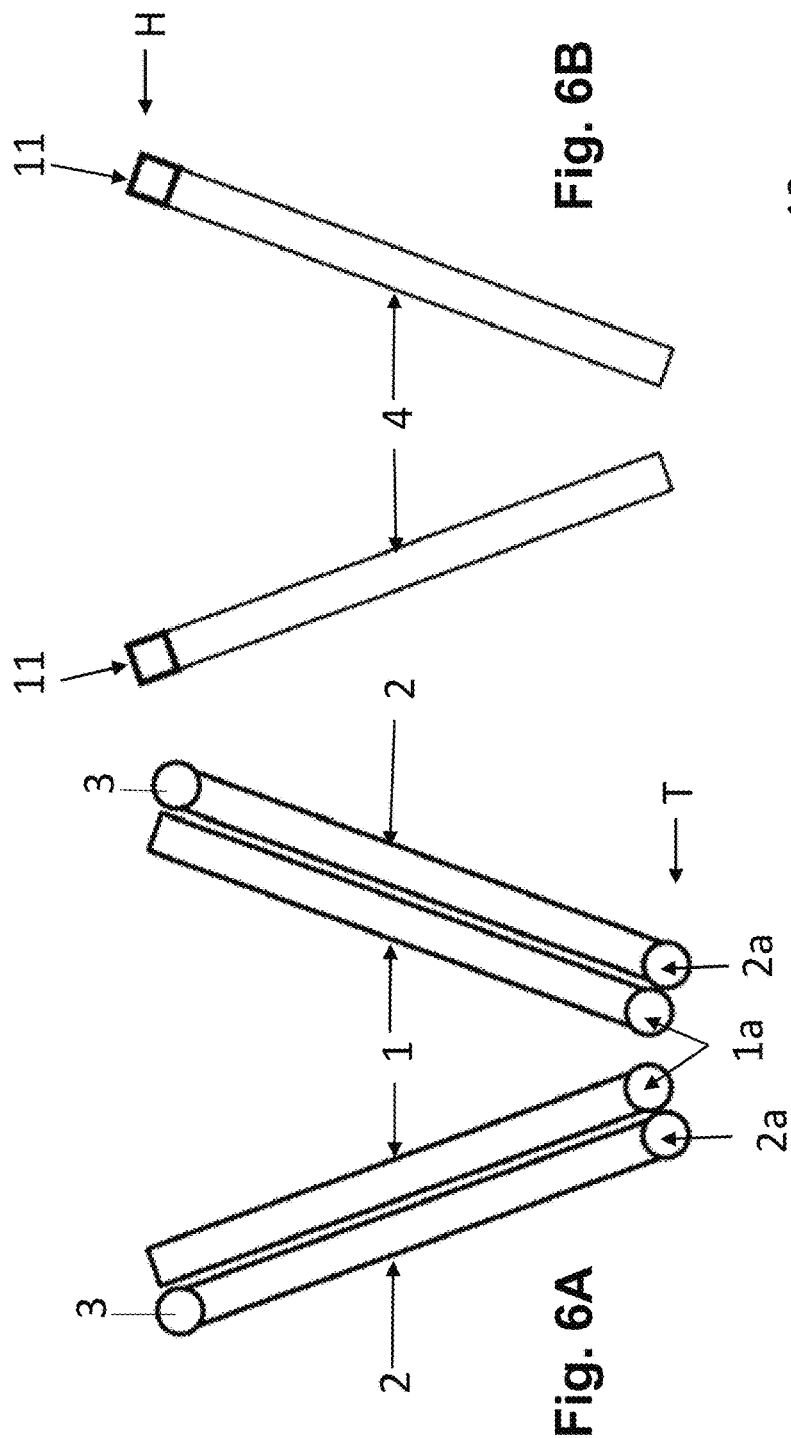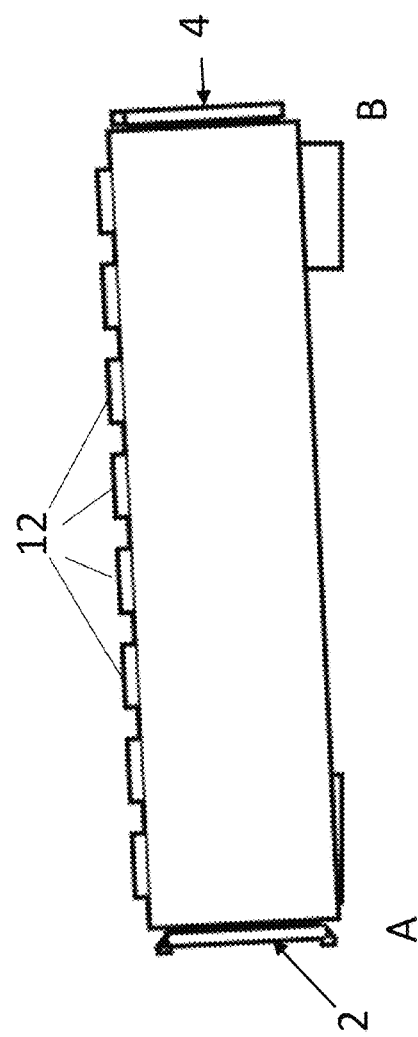

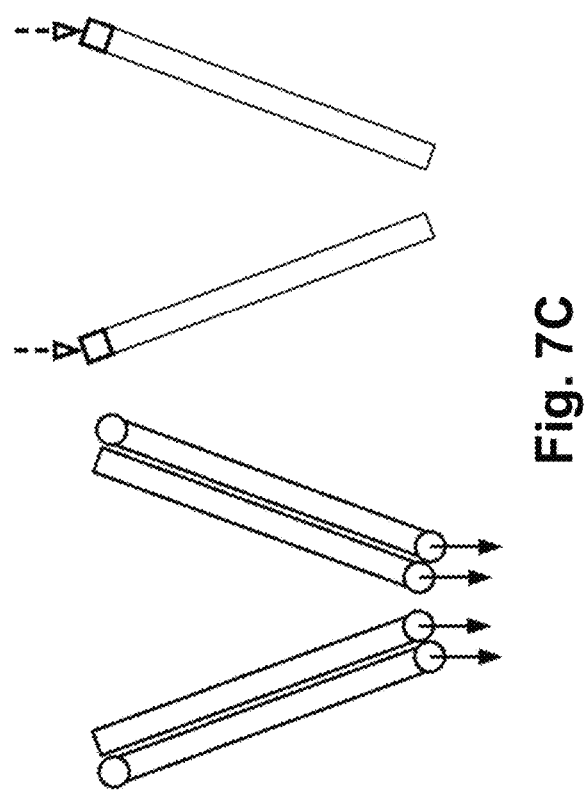
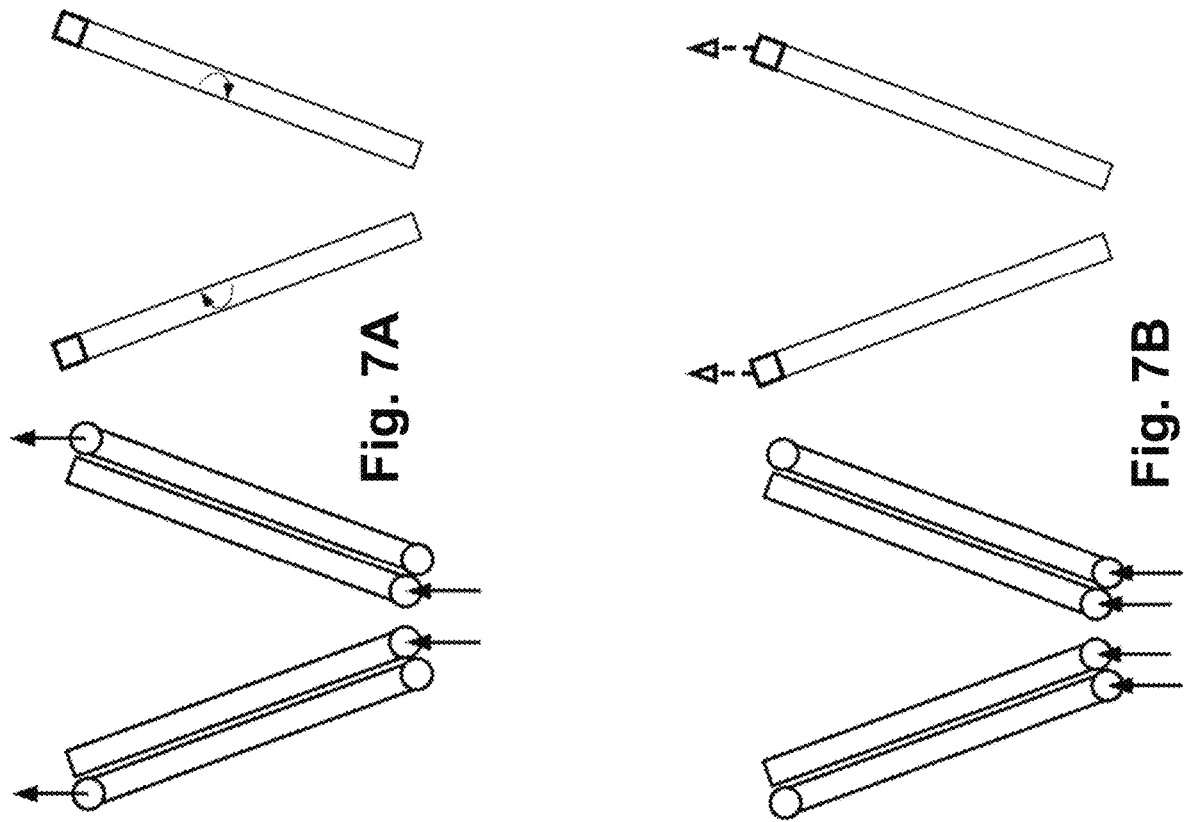

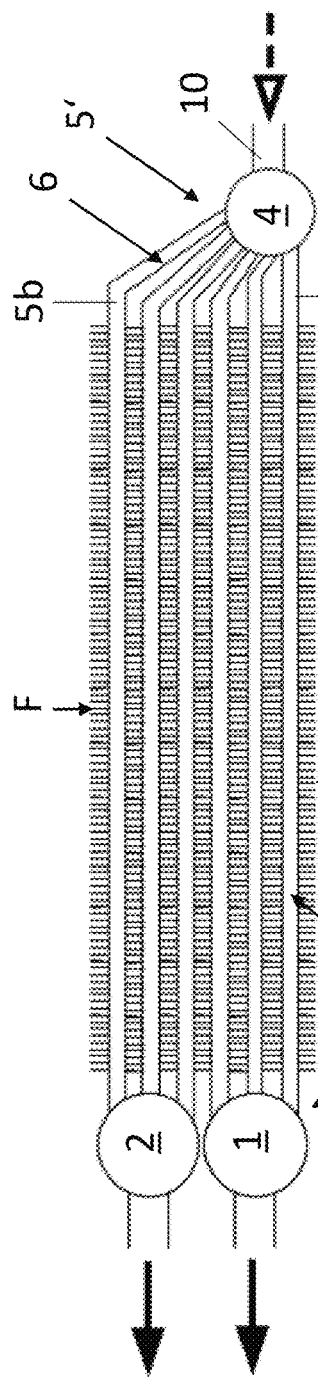
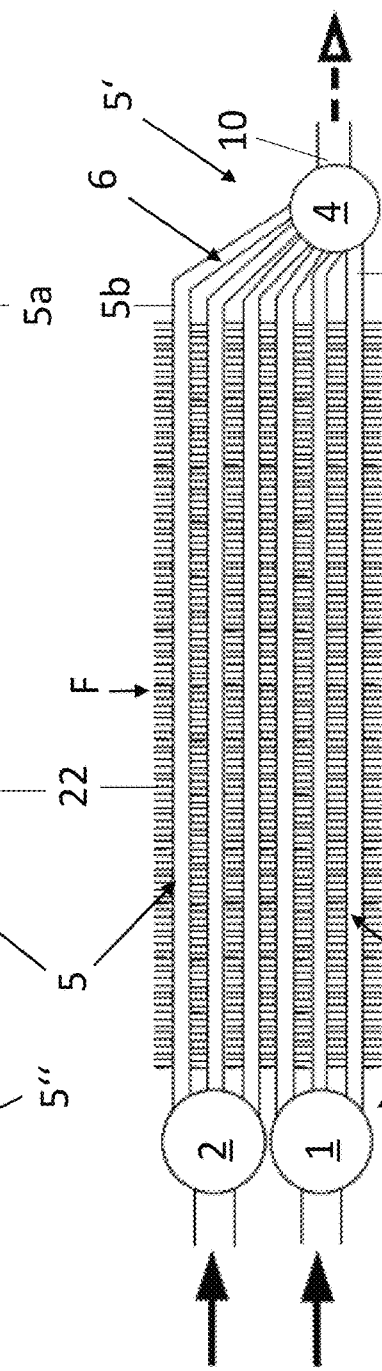
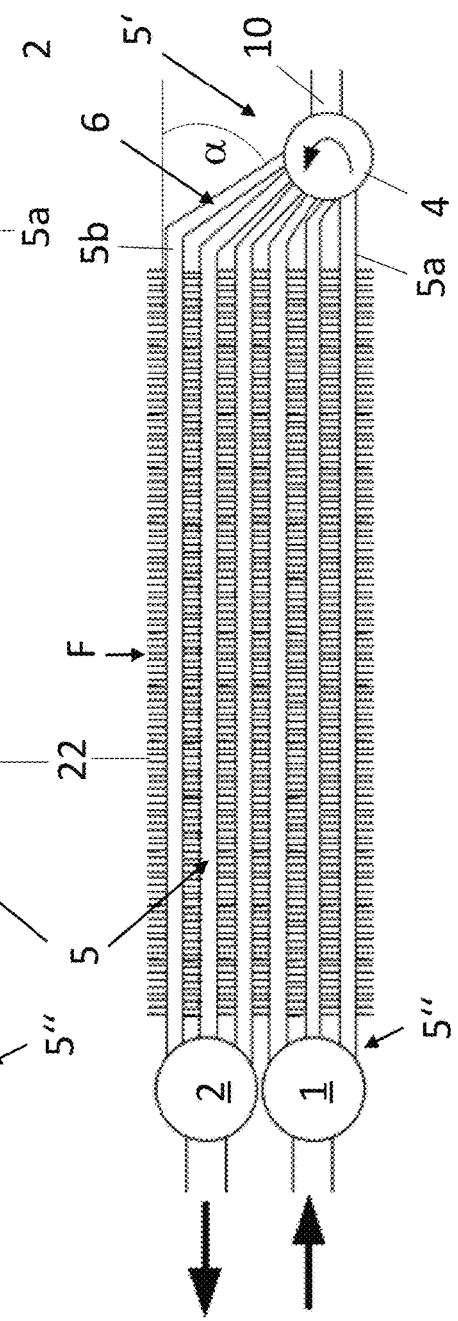

warm
cold
no flow

METHOD OF DRAINING AND FILLING MULTI-PASS HEAT EXCHANGER

CROSS-REFERENCE TO RELATED APPLICATIONS

The application is a continuation of International Patent Application No. PCT/EP2020/057986 filed Mar. 23, 2020, which claims priority to German Patent Application No. 2019DE-10110236 filed Apr. 18, 2019.

BACKGROUND OF THE INVENTION

The invention relates to a heat exchanger assembly having at least one multi-pass heat exchanger, which comprises a first and a second distributor, each having a connection piece for connecting to a fluid line, as well as at least one first deflection distributor and a plurality of pipelines, wherein a fluid, in particular water, can flow through the pipelines. The invention further relates to a method for operating a heat exchanger assembly of this kind.

Heat exchanger assemblies of this kind having at least one multi-pass heat exchanger can be used, for example, as recoolers in cooling systems for cooling a fluid that is used as the heat transfer medium in the cooling system. The recooler is generally placed outside a device to be cooled, for example outside a building. If water is used as the heat transfer medium, there is therefore a risk of the heat transfer medium freezing in the event of frost at the location where the recooler is installed.

Cooling systems having heat exchanger assemblies that allow the recooler to be emptied in an anti-freeze mode are therefore known from the prior art. For example, from WO2018/184908 A1 a cooling system with circulated water as heat transfer medium is known, which contains a recooler and a water tank, wherein the recooler comprises an inlet collector and an outlet collector at a first end region and a deflection collector having a first and a second branch arranged in a V-shape relative to one another at its second end region opposite the first end region. The first branch and the second branch of the deflection collector are connected to each other via a connecting branch arranged at their upper end, wherein a vent opening is arranged in the connecting branch. A first pipe arrangement which rises in a flow direction extends between the inlet collector and the first branch of the deflection collector, and a second pipe arrangement which falls in the flow direction extends between the second branch of the deflection collector and the outlet collector. The non-pressurized water tank is connected to an inlet at the inlet collector and to an outlet at the outlet collector such that the cooling water stored in the water tank can be conducted through the recooler in a closed circuit. For ventilation, the water tank is connected to the recooler via a vent line that flows into the vent opening on the connecting branch of the deflection collector. The recooler thus formed has two single-pass registers connected in series having a first tube assembly formed as a supply line connecting the inlet collector to the deflection collector and forming a first single-pass register, and a second tube assembly forming a second single-pass register which runs between the deflection collector and the outlet collector to connect the deflection collector to the outlet collector. In a recooling mode, the water conducted through the pipe arrangements is cooled by heat exchange with drawn-in ambient air. For this purpose, the cooling water stored in the water tank is conducted through the recooler by means of a circulating pump. To empty the recooler if there is a risk of frost, this known cooling system provides for the circulating pump to be switched off. When the circulating pump is switched off, the recooler empties automatically as a result of the constant ventilation of the deflection collector in conjunction with the gradient of the two pipe arrangements of the two single-pass registers.

However, heat exchanger assemblies having one or more single-pass registers connected in series (single-pass heat exchangers) have a lower cooling efficiency compared with multi-pass systems, in which the cooling medium passes through the heat exchanger(s) several times. Heat exchanger assemblies having multi-pass registers are therefore frequently used to improve the cooling efficiency and to increase the cooling capacity. This is especially necessary if a cooling capacity of between 100 and 1500 kW is to be achieved.

A cooling assembly having a two-pass register is known, for example, from WO 90/15299-A. The cooling water used therein as the heat transfer medium flows through a heat exchanger of the cooling system twice (2-pass heat exchanger). For this purpose, a heat exchanger is provided having an inlet collector arranged at one end of the heat exchanger and an outlet collector as well as a deflection collector arranged at the opposite end, wherein pipelines formed as supply lines extend between the inlet collector and the deflection collector and pipelines formed as recirculating lines extend between the deflection collector and the outlet collector. In a recooling mode, the cooling water is first conducted through the supply lines in a first pass and through the recirculating lines in a second pass. As the cooling water passes through the pipelines of the two-pass heat exchanger, heat exchange takes place with an air stream of ambient air drawn in by a fan and conducted through the two-pass heat exchanger, in order to cool the cooling water.

When using multi-pass heat exchangers in areas subject to frost, there is a risk that the multi-pass heat exchanger cannot be emptied quickly enough or completely enough to prevent the heat transfer medium (especially cooling water) from freezing. Particularly when the temperature of the heat transfer medium located in the multi-pass heat exchanger drops very quickly as a result of a rapid decrease in the ambient temperature or a strong wind influence on the heat exchanger, it must be ensured, even when using multi-pass heat exchangers, that the heat exchanger can be completely emptied within a very short period of time in order to prevent the heat transfer medium from freezing. However, rapid emptying of a multi-pass heat exchanger is difficult due to the long pipelines through which the heat transfer medium flows multiple times and the resulting long transport paths of the heat transfer medium through the pipelines of the multi-pass heat exchanger. The length of the pipelines (of a supply and recirculating line) can be between 3 and 15 m. For the same reason, rapid refilling of a multi-pass heat exchanger when resuming recooling mode once the risk of frost has passed is also difficult.

BRIEF SUMMARY OF THE INVENTION

Based on this, it is the object of the invention to demonstrate a heat exchanger assembly having at least one multi-pass heat exchanger, which has a high cooling capacity with the highest possible efficiency and can be emptied as quickly and completely as possible when there is a risk of frost and which can also be refilled with a heat transfer medium as quickly as possible for a resumption of recooling mode after the risk of frost has ended.

These objects are achieved according to the invention by a method for operating a heat exchanger assembly. Further contributing to achieving the object is a cooling system, in which a heat exchanger assembly operated according to the method is used as a recooler for cooling a fluid used as a heat transfer medium.

The heat exchanger assembly according to the invention comprises at least one multi-pass heat exchanger, in particular a two-pass or a four-pass heat exchanger, wherein the or each heat exchanger comprises a first and a second distributor each having a connection piece for connecting to a fluid line, as well as at least one first deflection distributor and a plurality of pipelines through which a fluid, in particular water, used as heat transfer medium can flow. Here, the first and second distributors distributor are arranged at one end of the heat exchanger assembly and the first deflection distributor is arranged at the opposite end of the heat exchanger assembly, and the pipelines extend from one end to the opposite end in order to connect the first and second distributors to one of the deflection distributors. Here, a first connection piece is arranged at a lowest point or at least near the lowest point of the first distributor, and a second connection piece is arranged at a lowest point or at least near the lowest point of the second distributor. Furthermore, a third connection piece is arranged on the second distributor at a highest point or at least near the highest point of the second distributor.

Where reference is made to a highest point of a distributor, the geodetically highest point of the respective distributor is what is meant. Where reference is made to a lowest point, the geodetically lowest point of the respective device (distributor) is meant in each case, in particular the lowest point seen in relation to the vertical direction. This also includes a point that is at least in the vicinity of the geodetically highest or geodetically lowest point.

By designing a heat exchanger assembly according to the invention having at least one multi-pass heat exchanger, both a fast emptying and a fast filling of the multi-pass heat exchanger(s) with the fluid used as heat transfer medium can be achieved, in that, in the event of a risk of frost in an emptying operation, due to an inclination of the pipelines to the horizontal, the fluid can flow off by gravity simultaneously from all of the pipelines into the first and the second distributor as well as into the third deflection distributor and from there in each case via a connection piece arranged at the lowest point of the first and the second distributor and of the third deflection distributor (first or second connection piece) into a fluid line connected to the connection pieces. In a corresponding manner, the fluid can be introduced very quickly against gravity from the first and second distributors simultaneously into all pipelines of the multi-pass heat exchanger in a filling mode. This significantly reduces the emptying or filling time when emptying or filling the heat exchanger, due to the fact that the fluid is not introduced into the multi-pass heat exchanger(s) according to the flow paths during recooling mode of the heat exchanger assembly, but can flow simultaneously into or out of all pipelines of the multi-pass heat exchanger via the first and second distributors.

Rapid outflow of the fluid out of the pipelines of the multi-pass heat exchanger in emptying mode is assisted by a slope of the pipelines relative to the horizontal plane. The pipelines, which are conveniently parallel to one another, preferably include an angle of between 0.5° and 5° with the horizontal, and more preferably an angle of between 2° and 4°, in particular 3°.

The multi-pass heat exchanger can, for example, be a 2-pass heat exchanger in which the fluid flows twice through the pipelines of the heat exchanger and is thereby in heat exchange with cooling air, which is conveniently drawn in from the environment by one or more fans and conducted through the heat exchanger.

The pipelines of each multi-pass heat exchanger are thereby divided into a first group of pipelines and a second group of pipelines, wherein the first group of pipelines serves as supply lines and the second group of pipelines serves as recirculating lines. In recooling mode, for example, the fluid can be introduced into the first distributor via the first connection piece, which is formed as an inlet distributor, and the fluid flows through the supply lines (first group of pipelines) of the 2-pass heat exchanger in a first pass to the first deflection distributor and is deflected from there into the return lines (second group of pipelines), so that the fluid can then flow back in a second pass in the recirculating lines to the second distributor (outlet distributor). The fluid exits the two-pass heat exchanger via the third connection piece arranged at the highest point of the second distributor. In the process, the two distributors (first and second distributors) are also interchangeable with one another, i.e., it is possible for the fluid first to flow into the second distributor, which is formed as an inlet distributor, and to flow out of the first distributor, which is formed as an outlet distributor.

The multi-pass heat exchanger can also be a 4-pass heat exchanger, in which the fluid flows four times through the pipelines of the heat exchanger while being in heat exchange with the cooling air. In a 4-pass heat exchanger, in addition to the first and second distributors and the first deflection distributor, a second and a third deflection distributor are provided, wherein the first and second distributors and the third deflection distributor are located at one end of the heat exchanger assembly and the first and second deflection distributors are located at the opposite end of the heat exchanger assembly and the pipelines extend from the one end to the opposite end to connect the first and second distributor to one of the deflection distributors. Here, a connection piece is again arranged at a lowest point or at least near the lowest point of the first distributor and the second distributor (first and second connection pieces), and on the second distributor a third connection piece is again arranged at a highest point or at least near the highest point of the second distributor. A fourth connection piece is conveniently arranged on the third deflection distributor at a lowest point or at least near the lowest point of the third deflection distributor.

In the recooling mode of the 4-pass heat exchanger, for example, the fluid can be introduced into the first distributor via the first connection piece, which is formed as an inlet distributor, and the fluid flows through the supply lines (first group of pipelines) of the 4-pass heat exchanger in a first pass to the first deflection distributor and is deflected from there into the recirculating lines (second group of pipelines) so that the fluid then flows back in a second pass in the recirculating lines to the third deflection distributor at the first end of the heat exchanger assembly and is deflected there from the third deflection distributor back into pipelines of the first group (supply lines) and flows in a third pass to the second deflection distributor and is deflected there again into pipelines of the second group (recirculating lines) and finally flows back in a fourth pass to the second distributor (outlet distributor). The fluid exits the multi-pass heat exchanger via the third connection piece arranged at the highest point of the second distributor. In the process, the two distributors (first and second distributors) are also interchangeable with one another, i.e., it is possible for the fluid first to flow into the second distributor, which is formed as an inlet distributor, and to flow out of the first distributor, which is formed as an outlet distributor.

To ensure that the multi-pass heat exchanger is completely filled with fluid at all times during filling and recooling mode (which can improve efficiency), it is preferable for both the 2-pass and 4-pass heat exchangers that the fluid enters the heat exchanger through the first connection piece (at the lowest point of the first distributor) and exits the heat exchanger at the third connection piece (at the highest point of the second distributor). Preferably, the distributor (second distributor), which contains the third connection piece at its highest point, is arranged in the heat exchanger assembly on the outside, i.e., towards the inflow surface.

For pressure equalization with the environment (i.e., with the atmospheric air pressure), a vent opening is arranged at least on one of the deflection distributors, in particular on the first and—in the case of the 4-pass heat exchanger—on the second deflection distributor. The vent opening is conveniently located at or near the highest point of the respective deflection distributor. Complete ventilation of the deflection distributors can thereby be ensured.

The distributors, i.e., the first and second distributors and each deflection distributor, can each be formed as tubular manifolds. The tubes of the distributors can be arranged vertical with their longitudinal axis or inclined obliquely to the vertical.

A high heat exchange efficiency and a compact design of the heat exchanger assembly can be achieved if the heat exchanger assembly contains two multi-pass heat exchangers arranged opposite each other, the two multi-pass heat exchangers being inclined obliquely to the vertical and arranged in a V-shape relative to one another. Corresponding to this obliquely assembly of the heat exchangers, the tubular distributors (first distributor and second distributor as well as the deflection distributors) are also oblique to the vertical.

A particularly compact design can be achieved when the first and second deflection distributors are contained in a common header tube having a partition disposed therein, wherein the partition divides the common header tube into an inflow region forming the first distributor and an outflow region forming the second distributor. In a corresponding manner, in the case of the 4-pass heat exchanger, the first and second deflection distributors, which are each arranged adjacent to one another at the other end of the heat exchanger assembly, can also be arranged in a common header tube having a partition wall, the partition wall dividing the header tube into at least two regions, a first region forming the first deflection distributor and a second region forming the second deflection distributor.

In a corresponding manner, in the case of the 4-pass heat exchanger, the first distributor, the second distributor and the third deflection distributor, which are each arranged adjacent to one another at one end of the heat exchanger assembly, can also be arranged in a common header tube, the header tube in turn containing a separating element which divides the header tube at least into an inflow region (which forms the first distributor), an outflow region (which forms the second distributor) and a deflection area (which forms the third deflection distributor). The first, second, third and fourth connection pieces are arranged in the common header tube, the first connection piece being arranged in the inflow region at a lowest point of the common header tube, the second connection piece being arranged in the outflow region at a highest point of the common header tube, the third connection piece being arranged in the outflow region at a lowest point of the common header tube, and the fourth connection piece being arranged at a lowest point of the deflection area.

In order to be able to open or close the first and second connection pieces and, if applicable, the fourth connection piece provided in the 4-pass heat exchanger, which are each arranged at a lowest point of the respective distributor (first distributor and second distributor, third deflection distributor if applicable), depending on the operating mode of the heat exchanger assembly, a controllable valve is preferably associated with each of these connection pieces. In particular, the controllable valve can be arranged in the respective connection piece (first, second or fourth connection piece). The controllable valves can be actuated, for example, hydraulically, pneumatically, or electrically.

In a convenient embodiment of the heat exchanger assembly, the first and second distributors and the third deflection distributor are arranged at a front-side end of the heat exchanger assembly, and the first and second deflection distributors are arranged at the opposite, rear face of the heat exchanger assembly. In the case of the 4-pass heat exchanger, the third deflection distributor is arranged on the front face adjacent to the first and second distributors and the second deflection distributor is arranged on the rear face adjacent to the first deflection distributor. As a result, it is possible to ensure a compact design of the heat exchanger assembly and dimensions that satisfy the requirements in terms of cooling capacity.

The heat exchanger assembly according to the invention can be operated both in the 2-pass and in the 4-pass version in various operating modes, in particular in a recooling mode, an emptying mode in case of risk of frost, a filling mode for initial filling of the heat exchanger assembly or for refilling after the risk of frost has ended, and in a standby mode after the heat exchanger assembly has been emptied in case of risk of frost or if frost persists. A control device for controlling the heat exchanger assembly is provided for switching the heat exchanger assembly from one operating mode into another operating mode. The control of the heat exchanger assembly, and in particular the setting of a suitable operating mode, is carried out as a function of ambient parameters, such as the outside temperature and the wind speed at the installation site of the heat exchanger assembly. For detecting the ambient parameters, sensors, in particular a thermometer for detecting the outside temperature and an anemometer for detecting the wind speed, are conveniently provided and coupled to the control device. The measured values of the ambient parameters, as detected by the sensors, are supplied to the control device. In addition to the ambient parameters such as outside temperature and wind speed, the inlet temperature of the fluid as it enters the heat exchanger assembly is conveniently detected via additional sensors, in particular thermometers. Furthermore, the volume flow rate of the fluid stream flowing into the heat exchanger assembly or flowing out of the heat exchanger assembly can be measured via pressure or flow sensors and be transferred to the control device. The control device calculates a predicted outlet temperature of the fluid as it exits the heat exchanger assembly based on the supplied measured values, in particular taking into account the outside temperature and the inlet temperature of the fluid. If the calculated output temperature is greater than or equal to a predetermined limit value, the control device switches the operation of the heat exchanger assembly from recooling mode into emptying mode. At low outside temperatures below the freezing point of the fluid (which is preferably water), a risk of the fluid freezing can be detected from the calculated output temperature of the fluid as it exits the heat exchanger assembly. In such a situation, to prevent the fluid from freezing in the pipelines or the distributors of the heat the distributors of the heat exchanger assembly, the control device switches as quickly as possible to emptying mode, in which the fluid in the pipelines can flow simultaneously out of all of the pipelines into the first and second distributors and the third deflection distributor, which may be present (in the case of the 4-pass heat exchanger), and from there through the connection pieces arranged in each case at the lowest point of these distributors (first, second and fourth connection piece) into a fluid line in connection with these connection pieces from the area at risk of frost.

These and other features and advantages of the invention will be apparent from the exemplary embodiment described in more detail below with reference to the accompanying drawings. In the drawings:

BRIEF DESCRIPTION OF THE SEVERAL VIEWS OF THE DRAWINGS

FIGS. 3A-3C: are a schematic representation of various operating modes of the heat exchanger assembly of FIGS. 1 and 2, where FIG. 3A shows a recooling mode, FIG. 3B shows a filling mode, and FIG. 3C shows an emptying mode of a multi-pass heat exchanger of the heat exchanger assembly.

FIGS. 6A-6C: are an overview of the second exemplary embodiment of a heat exchanger assembly according to the invention having two 2-pass heat exchangers arranged in a V-shape relative to one another in a view of the front face of the heat exchanger assembly (FIG. 6A), of the rear face of the 2-pass heat exchanger assembly (FIG. 6B) and in a side view (FIG. 6C).

FIGS. 7A-7C: are a schematic representation of different operating modes of the 2-pass heat exchanger assembly of FIGS. 6A-6C, where FIG. 7A shows a recooling mode, FIG. 7B shows a filling mode and FIG. 7C shows an emptying mode of the 2-pass heat exchanger.

FIGS. 8A-8B: shows representations of the various operating modes of the 2-pass heat exchanger assembly of FIGS. 7A-7C by means of sectional drawings of the 2-pass heat exchanger through a horizontal plane, where FIG. 8A shows the recooling mode, FIG. 8B shows the filling mode, and FIG. 8C shows the emptying mode of the 2-pass heat exchanger.

FIG. 9A shows the entire cooling system and the heat exchanger assembly used therein both in a view of the front face and in a side view and FIG. 9B shows a detailed view from FIG. 9a in the area of the heat exchanger assembly.

FIG. 10A shows the heat exchanger assembly in recooling mode, FIG. 10B shows the heat exchanger assembly in emptying mode, and FIG. 10C shows the heat exchanger assembly in filling mode.

DETAILED DESCRIPTION OF THE INVENTION

Figure 1:
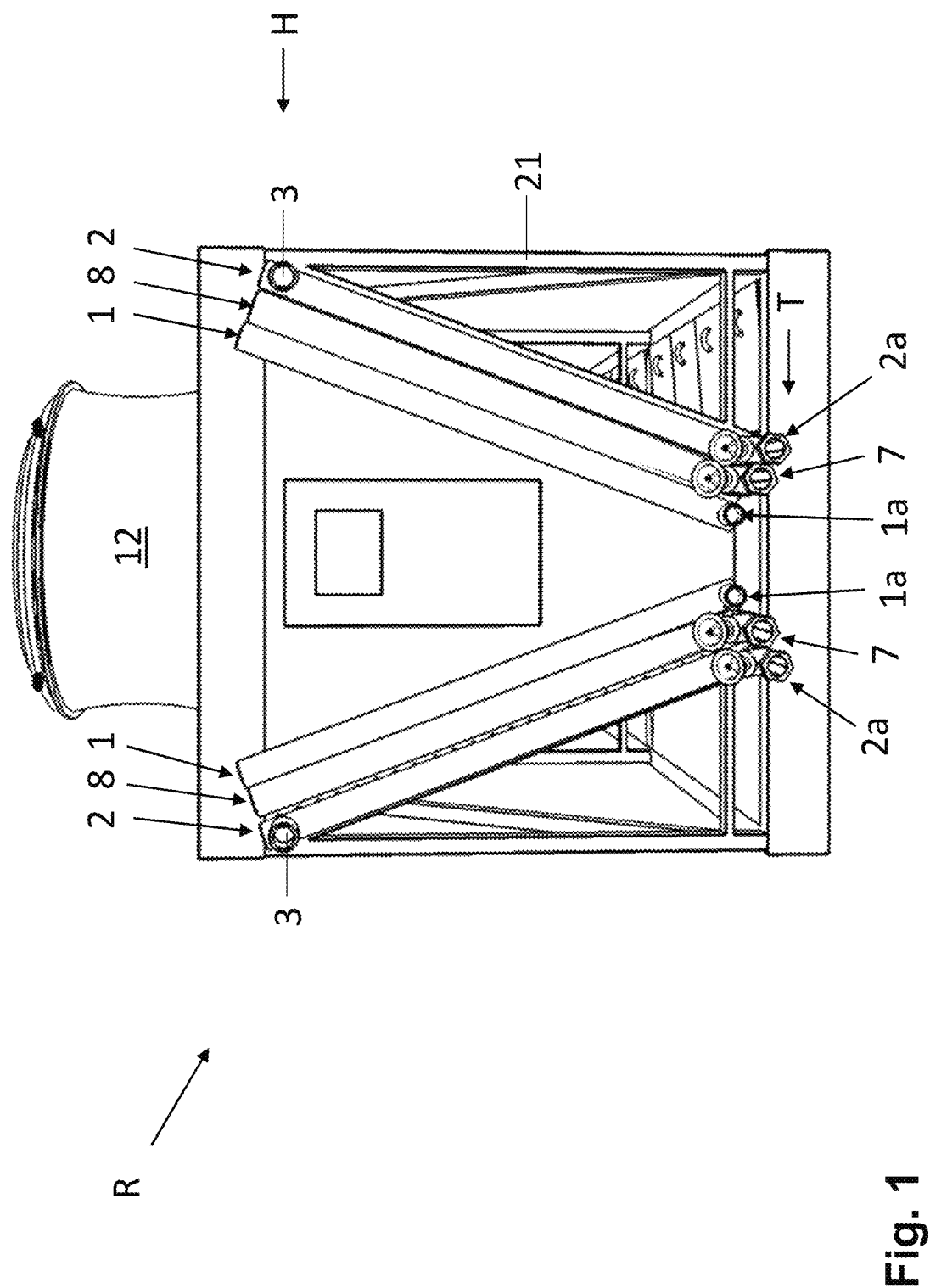
FIG. 1: is a representation of a first exemplary embodiment of a heat exchanger assembly according to the invention having two 4-pass heat exchangers arranged in a V-shape relative to one another, in a view of a front face of the heat exchanger assembly.
Figure 2:
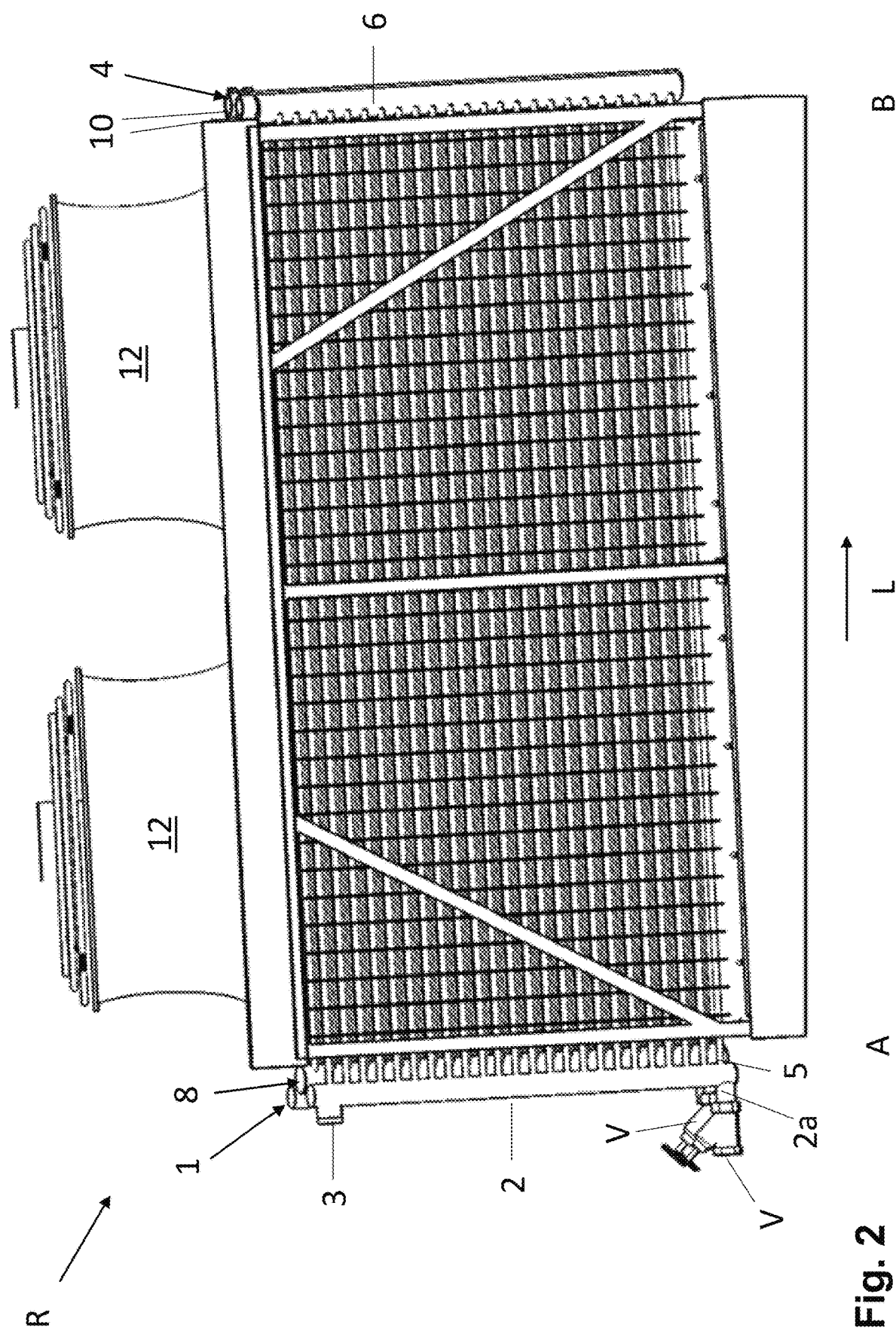
FIG. 2: is a side view of the 4-pass heat exchanger assembly of FIG. 1.

FIGS. 1 and 2 show an exemplary embodiment of a heat exchanger assembly according to the invention, which can be used as a recooler R for cooling a fluid used as a heat transfer medium in a cooling system. In particular, water can be used as the heat transfer medium. In the following, the term water refers to the fluid used as the heat transfer medium, wherein another fluid can also be used as the heat transfer medium instead of water.

The heat exchanger assembly shown in FIGS. 1 and 2 includes two four-pass heat exchangers, which contain opposing planar heat exchangers extending obliquely to the vertical. As can be seen from the view of FIG. 1, the two heat exchangers are arranged in a V-shape relative to one another. The structure of the heat exchanger arranged on the right-hand side of FIG. 1 is explained below. The opposite heat exchanger arranged on the left-hand side of the heat exchanger assembly is constructed similarly. The two heat exchangers are attached to a housing 21 of the heat exchanger assembly. Each heat exchanger comprises a first distributor 1, formed as an inlet distributor, a second distributor 2, formed as an outlet distributor, as well as a first deflection distributor 4, a second deflection distributor 6 and a third deflection distributor 8, and a plurality of pipelines 5. The first distributor 1, the second distributor 2 and the third deflection distributor 8 are arranged at the front face end A of the heat exchanger assembly. The first and second deflection distributors 4, 6 are each arranged at the opposite end B of the heat exchanger assembly, i.e., at the rear face. The pipelines 5 extend in a longitudinal direction L of the heat exchanger assembly from one end A to the opposite end B. The pipelines 5 are thereby divided into a first group of pipelines 5a and a second group of pipelines 5b, wherein the first group of pipelines 5a serve as supply lines and the second group of pipelines 5b serve as recirculating lines. Some of the pipelines 5 of the first group of pipelines 5a (supply lines) connect the first distributor 1 (inlet distributor) to the first deflection distributor 4, and some of the pipelines 5 of the second group of pipelines 5b (return lines) connect the first deflection distributor 4 to the third deflection distributor 8. Some of the pipelines of the first group of pipelines 5a (supply lines) in turn connect the third deflection distributor 8 to the second deflection distributor 6, and some of the pipelines of the second group of pipelines 5b (return lines) in turn connect the second deflection distributor 6 to the second distributor 2 (outlet distributor), as shown in FIGS. 3A-3C. The pipelines 5 of the supply and recirculating lines run at least essentially parallel to each other and are slightly inclined to the horizontal, as can be seen in FIG. 2. The inclination angle of the pipelines 5 to the horizontal is preferably between 0.5° and 5°, particularly preferably between 2° and 4°, and in a preferred exemplary embodiment the angle between the pipelines and the horizontal plane is 3°.

A first connection piece 1a is arranged on the first distributor 1 (inlet distributor) at a lowest point T of this distributor 1. A second connection piece 2a is also arranged at a corresponding location, i.e., at a lowest point T, on the second distributor 2 (outlet distributor). On the second distributor 2 (outlet distributor), an additional connection piece, referred to as the third connection piece 3, is arranged at a highest point H. A connection piece 7, which is referred to as the fourth connection piece, is likewise arranged at the lowest point T of the third deflection distributor 8.

The deflection distributors (first and second deflection distributors 4, 6) arranged at the opposite end B of the heat exchanger assembly each have a vent opening 10 at a highest point H, as shown in FIG. 2. The vent opening 10 is conveniently arranged at the upper end of the deflection distributors 4, 6, which are formed as tubular manifolds. The opposite lower end of the tubular deflection distributors 4, 6 is closed. Conveniently, a valve 11 is arranged in each vent opening 10, with which the vent opening 10 can be opened or closed. However, the use of a valve in the vent openings 10 can also be omitted.

A controllable valve V for opening and closing each connection piece 3, 7 is inserted at least in the second connection piece 2a, which is arranged at the lower end of the second distributor 2 (outlet distributor), and in the fourth connection piece 7, which is arranged at the lower end of the third deflection distributor 8 (FIG. 2). The respective valve V can alternatively be placed at another location, e.g., in a fluid line connected to the respective connection piece 3, 7. The valves V can be controlled independently of one another in order to open or close the (lower) connection pieces 3 and 7 independently of one another.

FIGS. 3A-3C schematically show different operating modes of the heat exchanger assembly. In the recooling mode shown in FIG. 3a, for example, water is conducted through the pipelines 5 (supply lines 5a and recirculating lines 5b) of the heat exchanger assembly as the heat transfer medium. At the same time, (cold) ambient air is sucked in from the environment by at least one fan 12 arranged on the upper side of the heat exchanger assembly, as shown in FIGS. 1 and 2, and conducted through the heat exchangers of the heat exchanger assembly to perform a heat exchange between the heat transfer medium (water) conducted through the pipelines 5 and the drawn-in air. To increase the heat transfer efficiency, fins 22 are attached to the pipelines 5 (FIGS. 3A-3C) in order to increase the effective heat transfer area. In the exemplary embodiment shown, accordingly the heat exchangers are finned tube or fin-tube heat exchangers. Instead of conventional finned tube or fin-tube heat exchangers, micro-channel heat exchangers may also be used in the heat exchanger assembly according to the invention.

In the recooling mode shown schematically in FIG. 3a, the fluid used as the heat transfer medium is introduced via the first connection piece 1a into the first distributor 1 (inlet distributor) and from there is conducted through a part of the pipelines 5 of the first group of pipelines 5a (supply lines) to the first deflection distributor 4 and deflected therein into a part of the pipelines of the second group of pipelines 5a (return lines). The fluid flows through the recirculating lines to the third deflection distributor 8, where it is deflected again into part of the pipelines 5 of the first group of pipelines 5a (supply lines). The fluid flows in the supply lines to the second deflection distributor 6 and is deflected therein again into a part of the pipelines of the second group of pipelines 5a (recirculating lines) and finally flows into the second distributor 2 (outlet distributor). The fluid is withdrawn by the outlet distributor 2 through the third connection piece 3 arranged at the top end of the outlet distributor 2 and directed as a cooling medium into a cooling-medium reservoir (tank B) or directly to a consumer to be cooled, via a fluid line 9 connected to the third connection piece 3.

In the recooling mode according to FIG. 3a, the connection pieces 2a, 7 (second and fourth connection pieces) are closed by the respective valve V arranged therein.

FIG. 3b is a schematic view of the heat exchanger assembly in a filling mode, in which the heat exchangers can either be filled for the first time or can be refilled with the fluid after emptying. In filling mode, the lower connection pieces 2a and 7 (second and fourth connection pieces), which are arranged at the lower end of the second distributor 2 and of the third deflection distributor 8, respectively, are open. As a result, the fluid can be simultaneously filled into the first and second distributors 1, 2 and the third deflection distributor 8 via the connection pieces 1a, 2a and 7 arranged at the lower end of each of the two distributors 1, 2 and the third deflection distributor 8. The fluid subsequently flows, as shown in FIG. 3b, simultaneously through all of the pipelines 5 (i.e., through both the supply lines 5a and the recirculating lines 5b) in the same direction of flow from the one end A of the heat exchanger assembly to the opposite end B. Due to the inclination of the pipelines 5 towards the front end A, the fluid in the pipelines 5 thereby flows upwards against gravity in the direction of the deflection distributors 4, 6 arranged at the rear face end B. The air present in the first and second deflection distributors 4, 6 is forced out through the vent openings 10 at the upper end of these two deflection distributors 4, 6, whereby the two deflection distributors 4, 6 are vented. In order to prevent the fluid from escaping from the vent openings 10 when the heat exchangers are completely filled with the filled fluid, a self closing valve 11 is conveniently arranged in the vent openings 10. The valve 11 automatically closes the vent opening 10 as soon as an internal pressure arises in the valve due to the incoming fluid.

To determine when the heat exchanger assembly is completely filled with fluid, the hydrostatic pressure of the fluid in the heat exchanger assembly is detected by means of a pressure sensor (P). Once the hydrostatic pressure detected by the pressure sensor (P) exceeds a predetermined pressure limit value, the heat exchanger assembly is switched from filling mode to recooling mode. Alternatively, the control device S of the heat exchanger assembly can also calculate an expected filling time from the parameters of said assembly, and the filling mode can be terminated as soon as the calculated filling time has elapsed while filling the heat exchanger assembly with the fluid.

Conversely, analogously to the filling of the heat exchanger assembly with the fluid, the heat exchanger assembly can also be rapidly emptied by opening the valves V in or on the second connection piece 2a and on the fourth connection piece 7. FIG. 3c shows an emptying mode of the heat exchanger assembly in which, with open valves V in the second connection piece 2a and the fourth connection piece 7, the fluid can flow simultaneously from all of the pipelines 5 (i.e., from both the supply lines 5a and the recirculating lines 5b) by gravity and in the same flow direction along the incline of the pipelines 5 from the rear end B to the front end A into the first and second distributors 1, 2 and into the third deflection distributor 8. The flow of the fluid is thereby facilitated on the one hand by the inclination of the pipelines 5 towards the front end A and on the other hand by a ventilation of the first and the second deflection distributors 4, 6 via the vent openings 10. For the ventilation of the first and the second deflection distributors 4, 6, the valve 11 in the vent openings 10 is opened so that ambient air can flow through the vent openings 10 into the deflection distributors 4, 6. Finally, the fluid can flow out through the lower connection pieces 1a, 2a and 7 (first, second and third connection pieces) into a fluid line (not shown here) connected to said connection pieces 1a, 2a and 7.

The design of the heat exchangers according to the invention allows both rapid filling with the fluid and (in the event of risk of frost) rapid emptying of the heat exchanger assembly, due to the fluid being able to flow in and out through all of the pipelines 5 of the heat exchanger assembly simultaneously and in the same flow direction during both filling and outflowing.

Figure 4:
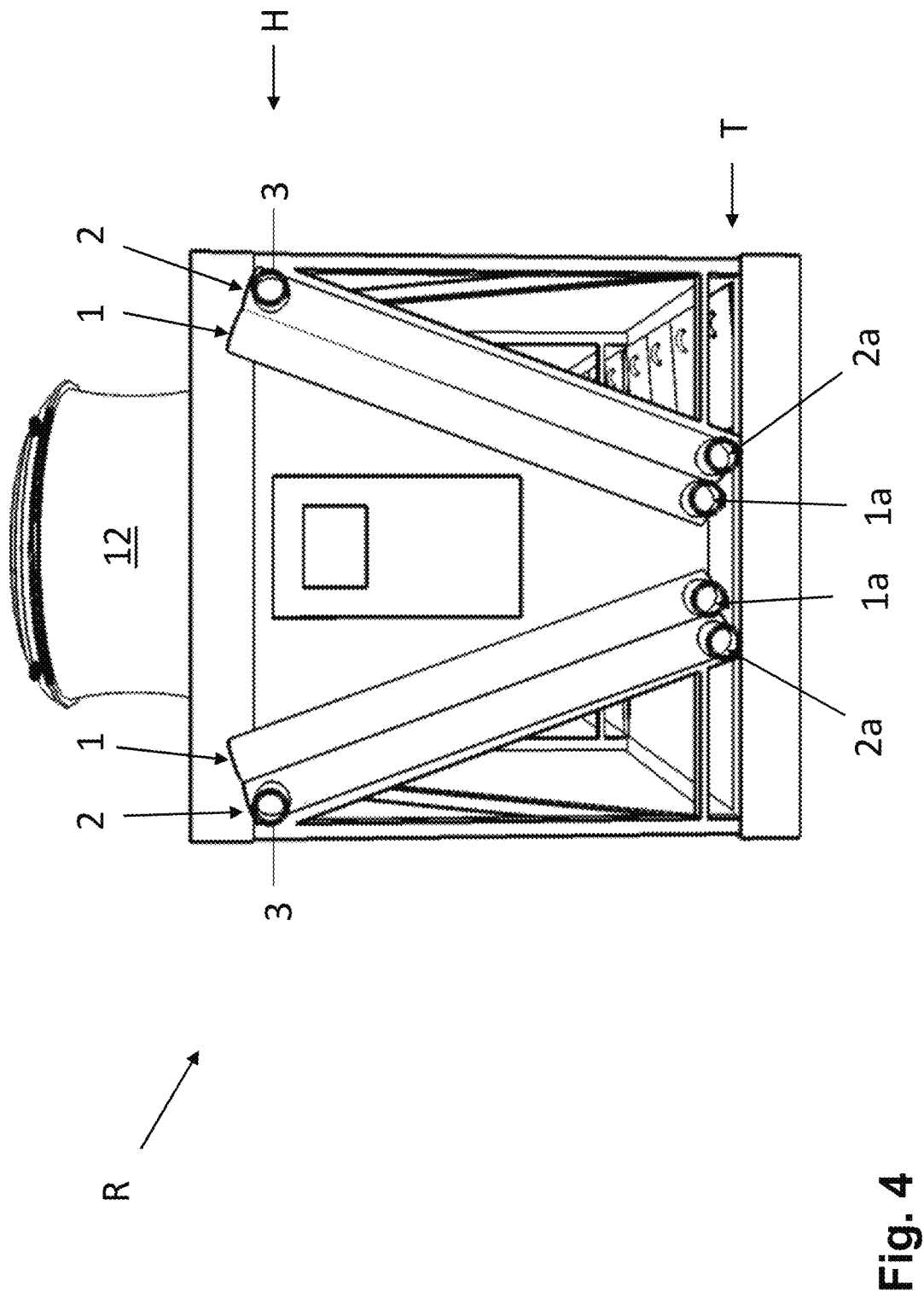
FIG. 4: is a representation of a second exemplary embodiment of a heat exchanger assembly according to the invention having two 2-pass heat exchangers arranged in a V-shape relative to one another, in a view of a front face of the heat exchanger assembly.
Figure 5:
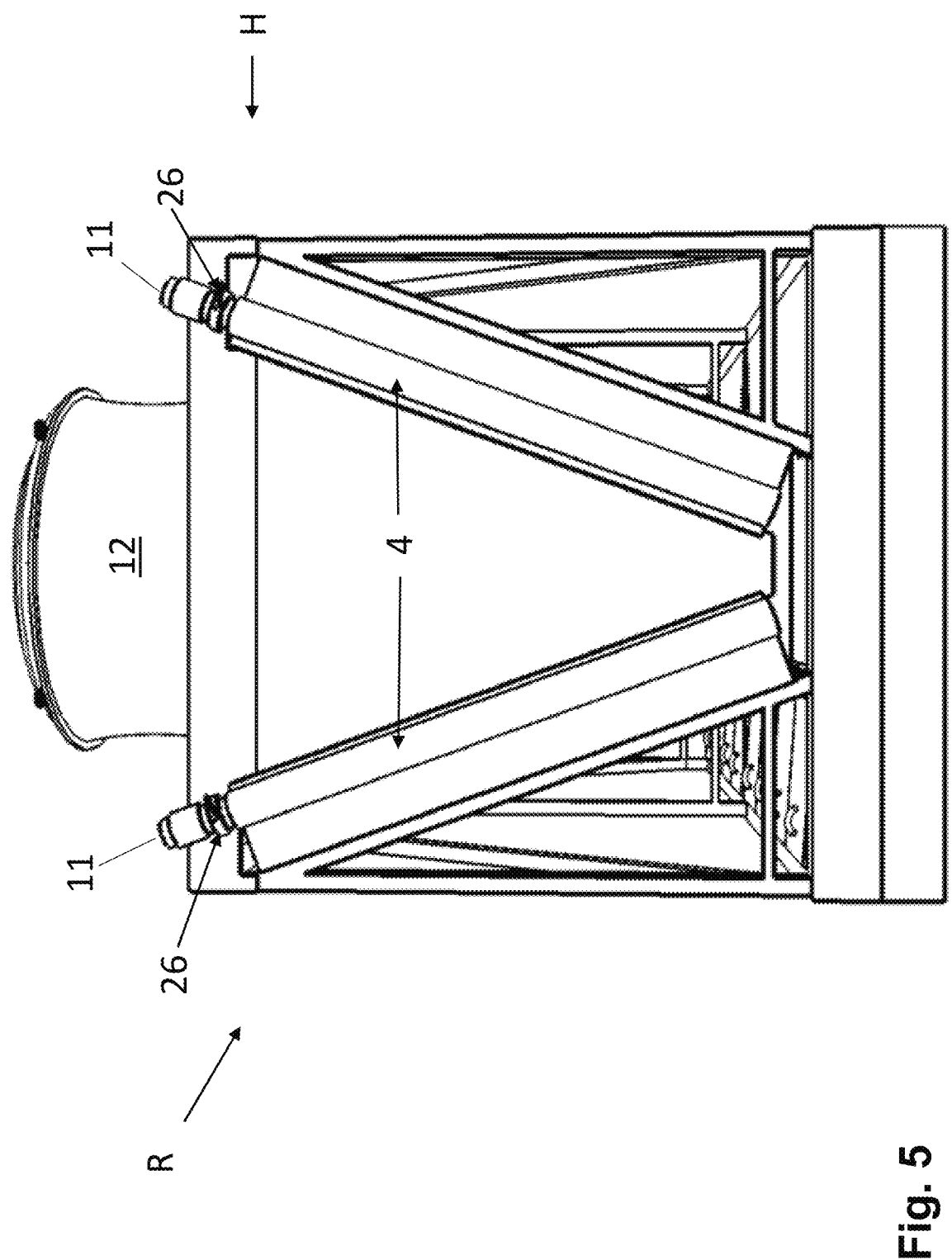
FIG. 5: is a view towards the rear face of the 2-pass heat exchanger assembly of FIG. 4.

FIGS. 4 and 5 show another exemplary embodiment of a heat exchanger assembly according to the invention, wherein the represented heat exchanger assembly contains two 2-pass heat exchangers which are arranged in a V-shape opposite each other and are inclined obliquely to the vertical. The inclination of the heat exchangers with respect to the vertical plane is conveniently in an angular range from 15° to 70° and preferably from 30° to 45°.

The structure of the heat exchanger arranged on the right-hand side of FIG. 4 is explained below. The opposite heat exchanger arranged on the left-hand side of the heat exchanger assembly is constructed similarly. The two 2-pass heat exchangers each comprise a first distributor 1, which is formed as an inlet distributor, a second distributor 2, which is formed as an outlet distributor, and a (single) first deflection distributor 4, and a plurality of pipelines 5. The first distributor 1 and the second distributor 2 are thereby arranged at the front face end A of the heat exchanger assembly. The deflection distributor 4 is arranged at the opposite end B of the heat exchanger assembly, i.e., at the rear face. The pipelines 5 extend in a longitudinal direction L of the heat exchanger assembly from one end A to the opposite end B. The pipelines 5 are thereby divided into a first group of pipelines 5a and a second group of pipelines 5b, wherein the first group of pipelines 5a serve as supply lines and the second group of pipelines 5b serve as recirculating lines. The pipelines 5 of the first group of pipelines 5a (supply lines) connect the first distributor 1 (inlet distributor) with the deflection distributor 4, the pipelines 5 of the second group of pipelines 5b (recirculating lines) connect the deflection distributor 4 with the second distributor 2 (outlet distributor), as shown in FIG. 4. The pipelines 5 of the supply and recirculating lines run at least partially parallel to one another and are slightly inclined to the horizontal, as can be seen in FIG. 6c. The angle of inclination of the pipelines 5 to the horizontal is again preferably between 0.5° and 5°, particularly preferably between 2° and 4°, and in a preferred exemplary embodiment the angle between the pipelines and the horizontal plane is 3°.

A first connection piece 1a is arranged on the first distributor 1 (inlet distributor) at a lowest point T of this distributor 1. A second connection piece 2a is also arranged at a corresponding location, i.e., at a lowest point T, on the second distributor 2 (outlet distributor). On the second distributor 2 (outlet distributor), an additional connection piece, referred to as the third connection piece 3, is arranged at a highest point H. The deflection distributor 4 arranged at the opposite end B of the heat exchanger assembly has a vent opening 10 at a highest point H, into which a valve 11 is inserted, as shown in FIG. 5. The vent opening 10 can be opened or closed via this valve 11, wherein the valve 11 is conveniently formed as a self closing valve which closes automatically as soon as a fluid enters the valve. A manually operated inspection valve 26 is provided below the valve 11, with which the upper end of the deflection distributor can be closed for inspection and maintenance work.

At least in the second connection piece 2a, which is arranged at the lower end of the second distributor 2 (outlet distributor), a controllable valve V (not shown here) is inserted for opening and closing the second connection piece 2a. Alternatively, the valve V can also be placed at another location, e.g., in a fluid line connected to the second connection piece 2a.

In FIGS. 6A-6C, an overview of the second exemplary embodiment of the heat exchanger assembly according to the invention schematically shows the front face of the 2-pass heat exchanger assembly (FIG. 6a), the rear face (FIG. 6b) and a side view (FIG. 6c). FIG. 6 shows in particular the placement of the connection pieces 1a, 2a and 3 on the first and second distributors 1, 2 as well as the inclination of the pipelines 5 towards the front end A.

In FIGS. 7A-7C and 8, different operating modes of the second exemplary embodiment of the heat exchanger assembly according to the invention (like FIGS. 4 to 6A-6C) are schematically shown. In the recooling mode shown in FIGS. 7a and 8a, water is conducted through the pipelines 5 (supply lines 5a and recirculating lines 5b) of the heat exchanger assembly as the heat transfer medium. At the same time, cold air is sucked in from the environment by at least one fan 12 arranged on the upper side of the heat exchanger assembly (as shown in FIG. 6c) and conducted through the heat exchangers of the heat exchanger assembly to perform a heat exchange between the heat transfer medium (water) conducted through the pipelines 5 and the drawn-in air. To increase heat transfer efficiency, fins 22 are in turn attached to the pipelines 5 (FIGS. 8A-8C) in order to increase the effective heat transfer area. Instead of conventional finned or fin-tube heat exchangers, micro-channel heat exchangers may also be used in this exemplary embodiment of the heat exchanger assembly according to the invention.

In the recooling mode shown in FIGS. 7a and 8a, the fluid used as the heat transfer medium is introduced into the first distributor 1 (inlet distributor) via the first connection piece 1a and is conducted from there through the pipelines 5 of the first group of pipelines 5a (supply lines) to the deflection distributor 4 and deflected therein into the pipelines of the second group of pipelines 5a (recirculating lines). The fluid flows through the recirculating lines back into the second distributor 2 (outlet distributor). The fluid is withdrawn from the outlet distributor 2 through the third connection piece 3 arranged at the top end of the outlet distributor 2 and directed as a cooling medium into a cooling-medium reservoir (tank B) or directly to a consumer to be cooled, via a fluid line connected to the third connection piece 3.

In the recooling mode according to FIGS. 7a and 8a, the second connection piece 2a is closed by the valve V arranged therein.

In FIGS. 7b and 8b, the heat exchanger assembly is shown in each case in a filling mode, in which the heat exchanger can either be filled for the first time or can be refilled with the fluid after emptying. In filling mode, the lower connection pieces 1a, 2a (first and second connection pieces), which are arranged at the lower end of the first and second distributors 2, respectively, are open. As a result, the fluid can be simultaneously filled into the first and second distributors 1, 2 via the lower connection pieces 1a, 2a. The fluid then flows, as shown in FIGS. 7b and 8b, simultaneously through all of the pipelines 5 (i.e., through both the supply lines 5a and the recirculating lines 5b) in the same direction of flow from the one end A of the heat exchanger assembly to the opposite end B. Due to the inclination of the pipelines 5 towards the front end A, the fluid in the pipelines 5 thereby flows upwards against gravity in the direction of the deflection distributor 4 arranged at the rear face end B. The air present in the deflection distributor 4 is forced out through the vent openings 10 at the upper end of the deflection distributor, whereby the deflection distributor 4 is vented. In order to prevent the fluid from escaping from the vent opening on the deflection distributor 4 when the heat exchangers are completely filled with the filled fluid, a self closing valve 11 is conveniently arranged in the vent opening 10.

Conversely, analogously to the filling of the heat exchanger assembly with the fluid, the heat exchanger assembly can also be rapidly emptied by opening the valve V in or on the second connection piece 2a. FIGS. 7c and 8c each show an emptying mode of the heat exchanger assembly in which, with open valve V in the second connection piece 2a, the fluid can flow simultaneously from all of the pipelines 5 (i.e., from both the supply lines 5a and the recirculating lines 5b) by gravity and in the same flow direction along the incline of the pipelines 5 from the rear end B to the front end A into the first and second distributors 1, 2. In this case, the flow of the fluid is again facilitated by the inclination of the pipelines 5 towards the front end A and by the ventilation of the deflection distributor 4 via the vent opening 10. Finally, the fluid can flow out through the lower connection pieces 1a, 2a (first and second connection pieces) into a fluid line (not shown here) connected to said connection pieces 1a, 2a.

Figure 9B:
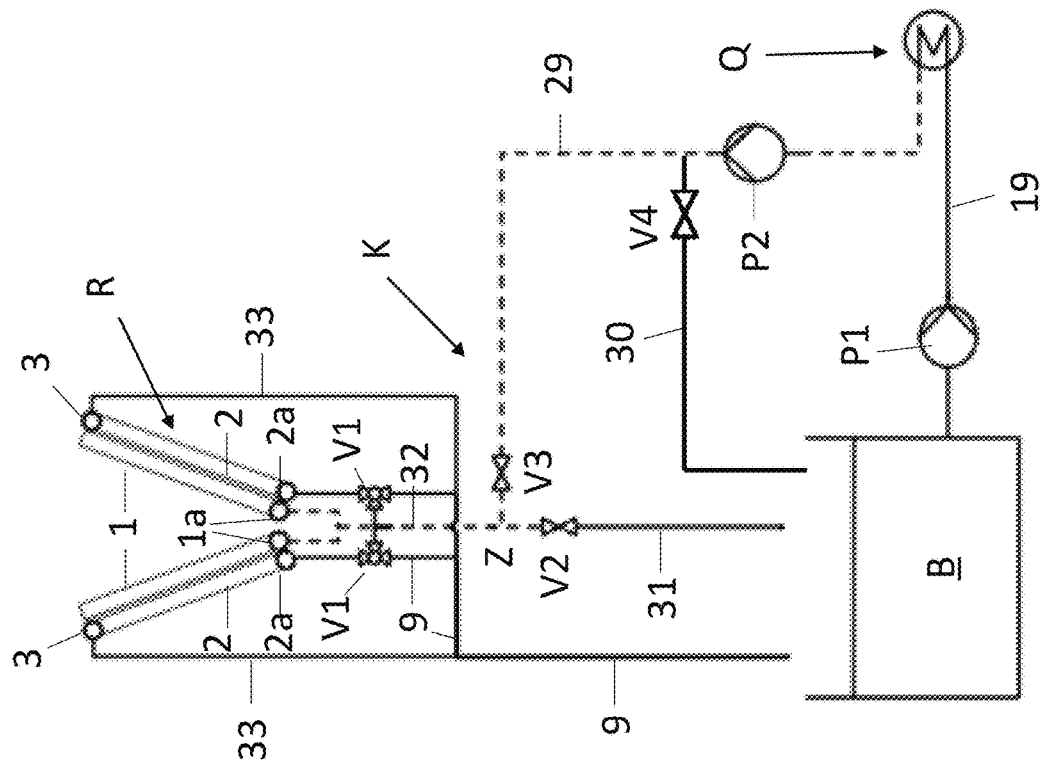
FIGS. 9A-9B: are a schematic representation of a cooling system containing a heat exchanger assembly according to the invention having two opposite 2-pass heat exchangers, where
Figure 9A:
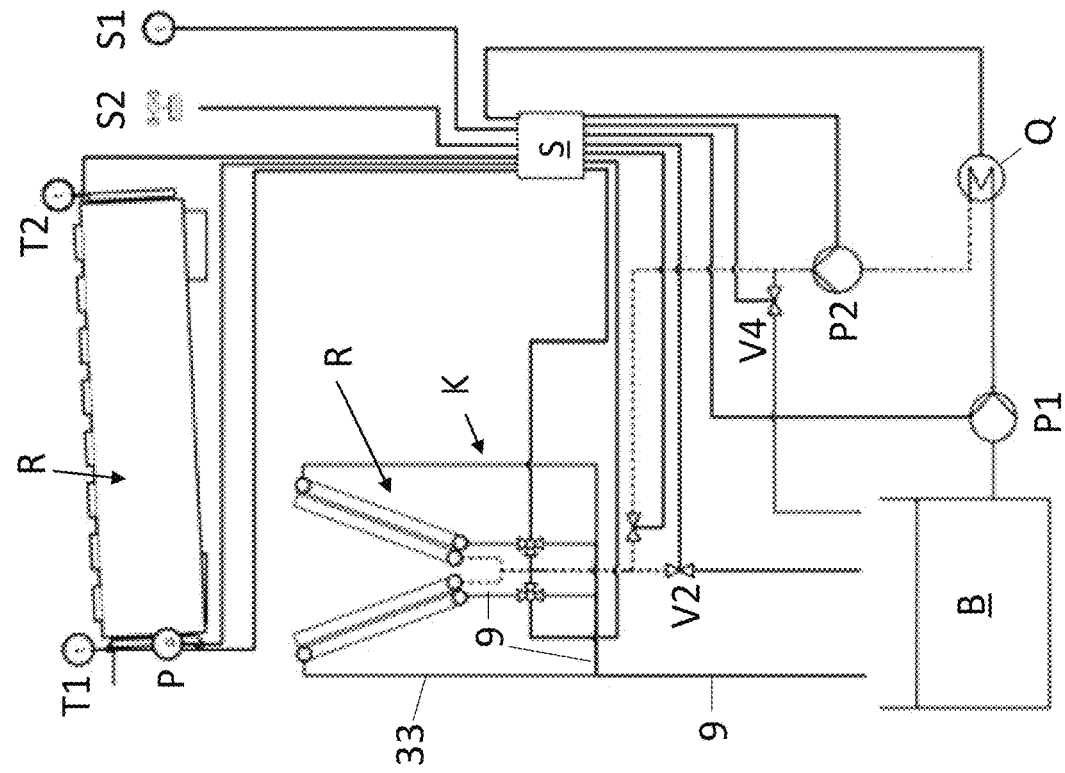

By way of example, FIGS. 9A-9B show a cooling system in which a heat exchanger assembly according to the invention may be used. The cooling system shown schematically in FIGS. 9A-9B comprises a circuit K in which a fluid, in particular water, is conducted as a heat transfer medium, a tank B which is connected to the circuit K and in which the fluid is stored, a heat source Q which supplies heat to the fluid at the location of the heat source, and at least one heat exchanger assembly according to the invention which is used in the cooling system as a recooler R in order to cool the fluid by heat exchange with the ambient air. In the example shown in FIGS. 9A-9B, the heat exchanger assembly having two 2-pass heat exchangers as shown in FIGS. 4 to 6 is used as the recooler R.

In the process, the recooler R of the cooling system shown in FIGS. 9A-9B is connected to the tank B via fluid lines 9. The tank B is preferably open to the surroundings of the tank location. A fluid line 19 leads from the tank B to the heat source Q in order to supply the cooled fluid stored in tank B as the cooling medium to the heat source Q. A first pump P1 is provided for delivering the fluid from the tank B to the heat source Q. At the location of the heat source Q, the fluid is heated by heat exchange and fed back to the recooler R through another line 29. Conveniently, a second pump P2 is arranged in the line 29, which delivers the fluid from the heat source Q back to the recooler R. A branch line 30 branches off from the line 29 into the tank B. A valve V4 is provided for opening and closing the branch line 30. Another valve V3 is arranged downstream of the branch line 30 in the line 29. The line 29 branches at a branch point Z into a recirculating line 31 to the tank B and into a feed line 32 leading to the recooler R. Another valve V2 is arranged in the recirculating line 31 for opening and closing this line. The feed line 32 branches into a central feed line and two secondary lines, in each of which a three-way valve V1 is arranged. The central feed line branches again into two branches, wherein a first branch is in connection with the first connection piece 1a of the left heat exchanger and a second branch is in connection with the first connection piece 1a of the right heat exchanger. The secondary lines lead to the second connection piece 2a of the left and right heat exchanger, as can be seen in FIG. 9b. The feed line 32 is thus connected to the lower connection pieces 1a and 2a of the heat exchanger assembly via the three-way valves V1. A discharge line 33 is connected to the (upper) third connection piece 3 of the heat exchanger assembly, which leads to line 9 and is connected to it.

Figure 10C:
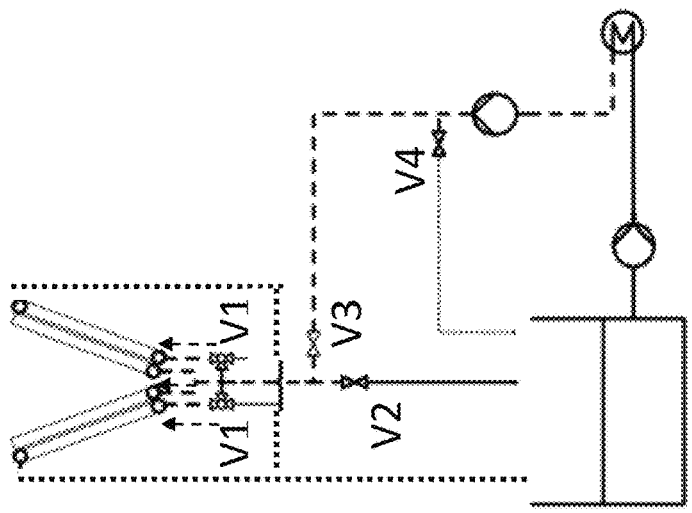
FIGS. 10A-10C: is a schematic representation of different operating modes of the heat exchanger assembly of the cooling system of FIGS. 9A-9B, where
Figure 10B:
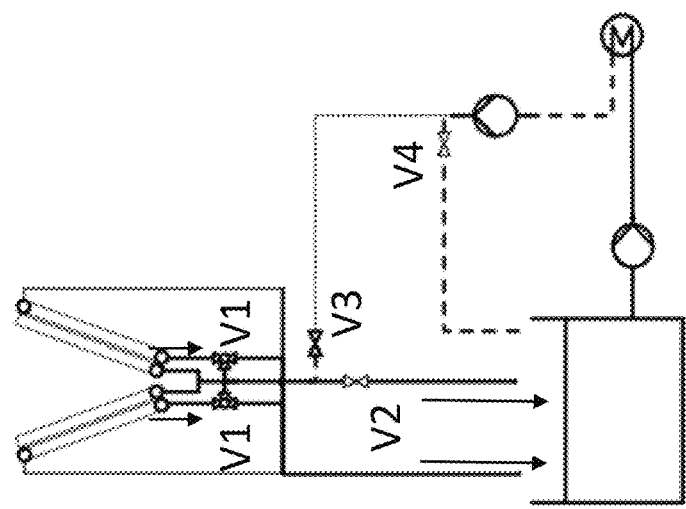
Figure 10A:
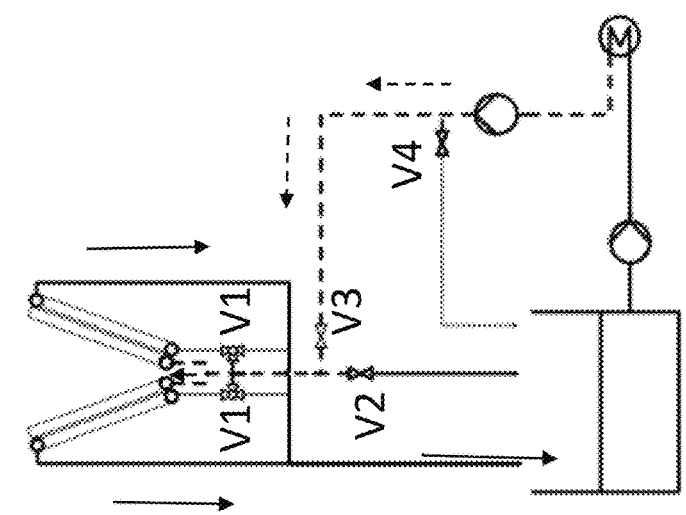

FIGS. 10A-10C show various operating modes of the heat exchanger assembly in the cooling system of FIGS. 9A-9B. The fluid is represented by a dashed line when in a warm state and represented by a solid line when in a cold state. Where the line is dotted, there is no flow of fluid.

FIG. 10a shows the cooling system from FIGS. 9A-9B in recooling mode. In this case, valves V2 and V4 are closed so that lines 30 and 31 are closed. Valve V3 is open so that the fluid heated by heat source Q can flow through lines 29 and 32 to the recooler R. In this case, the three-way valves V1 are closed so that the fluid can flow from line 32 respectively to the first connection piece 1a of the first distributor 1 (inlet distributor) of the two multi-pass heat exchangers and thereby enter the heat exchanger assembly. After the fluid has passed through the multi-pass heat exchangers of the recooler R several times, the cooled fluid exits the recooler R at the third connection piece 3 and flows, through the line 33 connected to the third connection piece 3, to the line 9 and from there into tank B in which the cooled fluid is stored.

In the emptying mode shown in FIG. 10b, valves V2 and V4 are open and valve V3 is closed. The three-way valves V1 are switched so that the fluid can flow from the lower connection pieces 1a, 2a (first and second connection pieces) into the fluid line 9 connected to these connection pieces and from there directly into tank B. During emptying of the recooler R, the fluid heated by the heat source Q is returned to tank B via the branch line 30 when valve V4 is open, without the fluid being directed through recooler R.

In the filling mode shown in FIG. 10 c, the valves V2 and V4 are closed and valve V3 is open. The three-way valves V1 are controlled in such a way that the fluid heated by the heat source Q is conducted via the lines 29 and 32 to the lower connection pieces 1a, 2a (first and second connection pieces) of the multi-pass heat exchangers and enters the recooler R from there. After the heat exchangers of recooler R have been completely filled, the recooler is switched to recooling mode (FIG. 10a).

Figure 11:
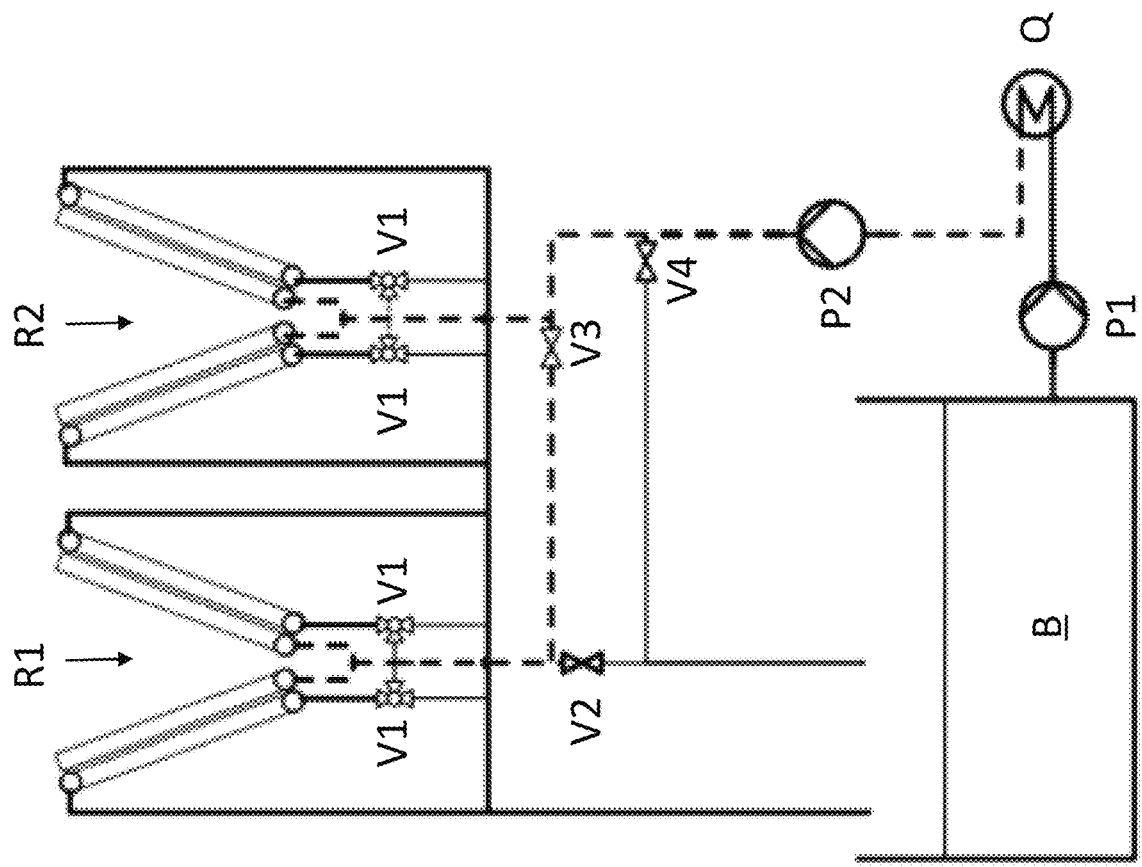
FIG. 11: is a schematic representation of another exemplary embodiment of a cooling system having a combination of two heat exchanger assemblies according to the invention.

FIG. 11 shows an exemplary embodiment of a cooling system in which two heat exchanger assemblies according to the invention can be used as recoolers R1, R2 in parallel or series mode. The two recoolers R1, R2 can, for example, be used simultaneously in series for cooling the fluid used as the heat transfer medium in the cooling system. When the two recoolers R1, R2 are used simultaneously, a maximum cooling capacity of the cooling system is achieved. If a lower cooling capacity is required to sufficiently cool the fluid, one of the two recoolers R1 or R2 can be turned off by the control device S of the cooling system.

In series mode, in which both recoolers R1, R2 are operated simultaneously to cool the fluid, valves V2 and V4 are closed and valve V3 is open so that the fluid heated by heat source Q can be introduced into both recoolers R1, R2 respectively through first connection piece 1a. The fluid cooled in the recoolers R1, R2 exits the recoolers R1, R2 at the third connection piece 3 in each case and flows through the fluid line 9 connected to the third connection piece 2a into the tank B (as shown in FIG. 11).

Figure 12A:
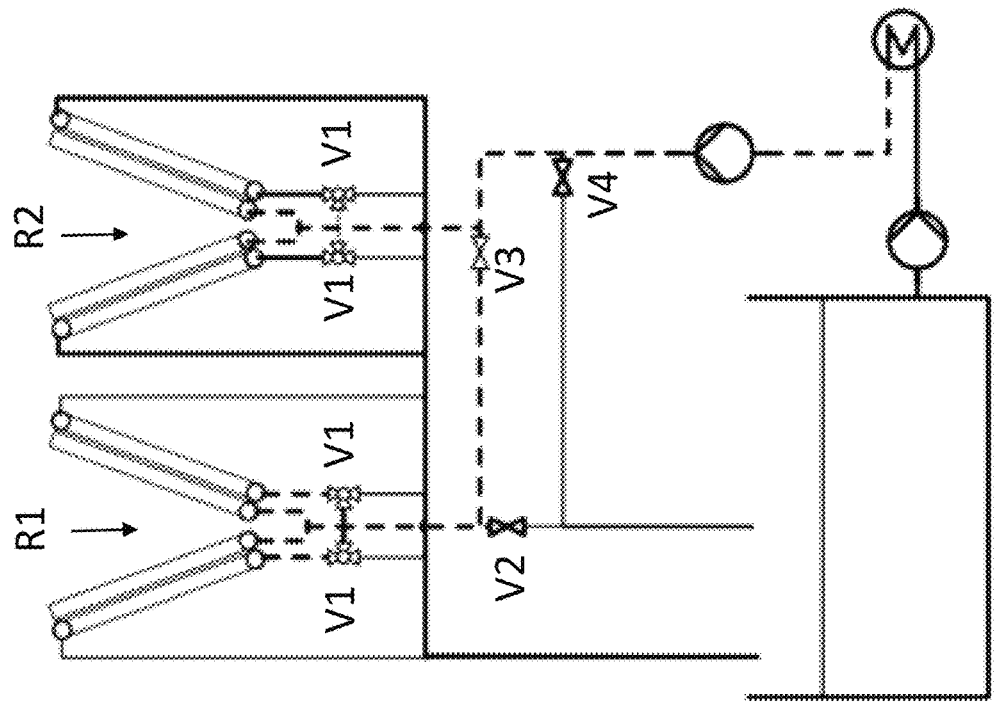
FIGS. 12A-12B: are a schematic representation of possible operating modes of the combination of heat exchanger assemblies from FIG. 11.

In the operating mode of the cooling system of FIG. 11 shown in FIG. 12a, valves V3 and V4 are closed and valve V2 is open. As a result, only the second recooler R2 is operated in recooling mode. The first recooler R1 is in a standby mode, in which no fluid is conducted through the pipelines of the first recooler R1.

Figure 12B:
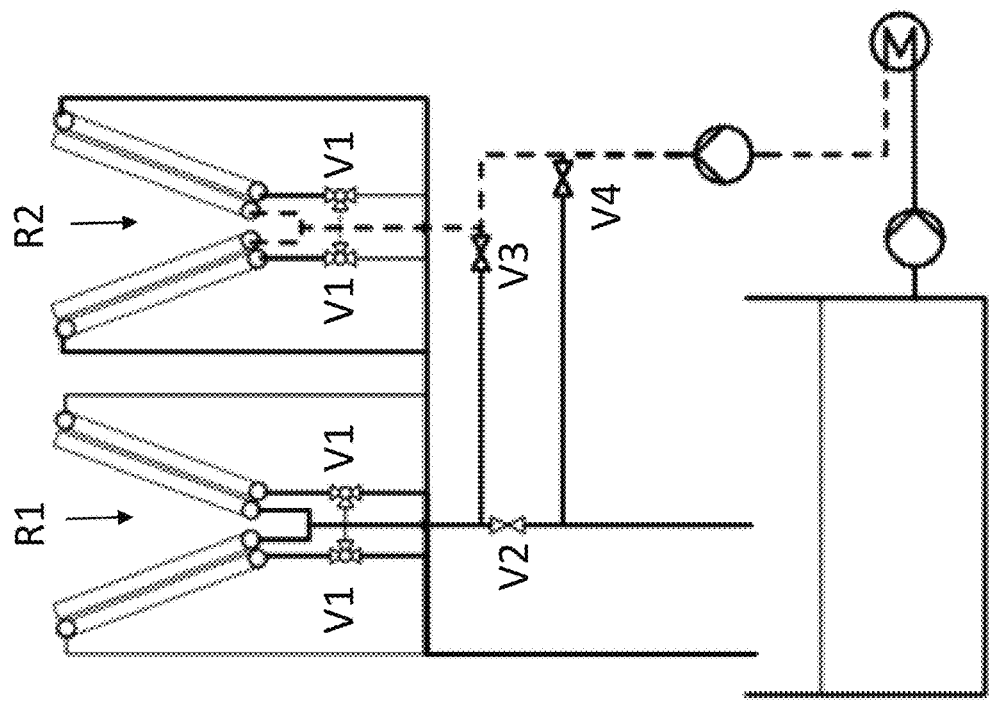

In the operating mode shown in FIG. 12b, with valve V3 open and valves V2 and V4 closed, the second recooler R2 is operated in recooling mode, in which the fluid heated by the heat source Q is introduced via the first connection piece 1a into the heat exchangers of the second recooler R2, where it is cooled, and is ultimately directed out of the second recooler R2 through the second connection piece 2a via the fluid line 9 connected to the third connection piece 3 and conducted into tank B. At the same time, the first recooler R1 is operated in filling mode, in which the fluid is simultaneously introduced into all of the pipelines 5 of the first recooler R1 via the first connection piece 1a and the second connection piece 2a of the heat exchangers in order to completely fill the recooler R1 with fluid.

To control the heat exchanger assembly according to the invention in the various operating modes, conveniently a plurality of sensors S1, S2 is used, with which ambient parameters, such as outside temperature (Tu) and/or wind speed (v) can be detected and transferred to a control device S for processing. In addition to the ambient parameters, the inlet temperature (in) of the fluid entering the heat exchanger assembly, the temperature of the fluid in the deflection distributors 4, 6, and the (hydrostatic) pressure (p) and/or the flow rate of the fluid entering the inlet distributor 1 are conveniently detected via additional sensors T1, T2, P.

The control device which is denoted by reference sign S in the diagram of the cooling system in FIG. 9a is coupled to the valves V, V1, V2, V3, V4 in order to control them. The measured values detected by the sensors S1, S2; T1, T2, P are transferred to the control device, and the control device calculates an output temperature ($T_{out}$) of the fluid as it exits the heat exchanger assembly based on the detected measured values. The calculation of the value of the outlet temperature ($T_{out}$) also takes into account the parameters of the heat exchanger assembly, in particular its thermal capacity, the dimensioning of the heat exchangers, the number of passes of the fluid through the pipelines, the fluid used as the heat transfer medium and the volume flow rate of the fluid through the pipelines, in order to determine a (maximum) cooling of the fluid when emptying the heat exchanger assembly.

The control device controls the valves of the heat exchanger assembly so that the heat exchanger assembly is operated in recooling mode as long as the calculated outlet temperature ($T_{out}$) is greater than or equal to a predetermined limit value ($T_{min}$). As soon as the calculated output temperature ($T_{out}$) falls below the limit value (i.e., when $T_{out}<T_{min}$), the heat exchanger assembly is switched to emptying mode. This is done, for example, by electrically or pneumatically actuating the valves V, V1, V2, V3, V4.

The predetermined limit value ($T_{min}$) is conveniently above the freezing point of the fluid used as the heat transfer medium by a value Δ (i.e., above 0° C. for water), wherein the value Δ represents a safety distance from the freezing point. Therefore, even in the event of rapid emptying, it is ensured that the fluid does not freeze if there is a risk of frost.

Preferably, the value Δ (and thus, when water is used as the heat transfer medium, the limit value $T_{min}=0°$ C.+Δ) is between 2° C. and 7° C.

Once the heat exchanger assembly has been completely emptied, it is left in a standby mode, in which the heat exchangers are not filled with fluid. In standby mode, it is monitored whether the risk of frost has passed or is ongoing by calculating the predicted output temperature ($T_{out}$) based on the detected ambient parameters and comparing it with the limit value. Once the calculated outlet temperature ($T_{out}$) is greater than or equal to the predetermined limit value ($T_{min}$), the control device switches the heat exchanger assembly from standby mode into filling mode. After the heat exchanger assembly has been completely filled, it is switched to recooling mode and operated until the calculated outlet temperature ($T_{out}$) is below the limit value.

In the exemplary embodiment shown in FIG. 11, the heat exchanger assembly comprising a plurality of heat exchangers is controlled by the control device in such a way that the individual multi-pass heat exchangers can be operated independently of one another in the various operating modes. In the process, the control device controls the number of heat exchangers operated in recooling mode as a function of the detected ambient parameters and/or the detected input temperature (Tin) of the fluid in order to be able to provide a required cooling capacity. Expediently, the fluid volume conducted through the heat exchanger assembly per unit of time remains the same regardless of the number of heat exchangers operated in recooling mode. In the process, the control device monitors whether the temperature of the fluid cooled in the heat exchanger assembly and stored in the tank is within a preferred temperature range between a minimum and a maximum temperature. The preferred temperature range may be, for example, between 15° C. and 22° C.

The invention claimed is:

1. A method for operating a heat exchanger assembly having at least one heat exchanger comprising:
a first distributor formed as a tubular manifold and having a first connection piece for connecting to a first fluid line,
a second distributor formed as a tubular manifold and having a second connection piece for connecting to a second fluid line,
at least one first deflection distributor formed as a tubular manifold and having a vent opening,
a plurality of pipelines adapted for a fluid to flow therethrough, the plurality of pipelines is comprising a first group of pipelines serving as supply lines and a second group of pipelines serving as recirculating lines, wherein at least some of the pipelines of the first group of pipelines is connecting the first distributor with the first deflection distributor,
wherein the first distributor and the second distributor are arranged at a first end of the heat exchanger assembly and the deflection distributor is arranged at a second end thereof and the pipelines extend in a longitudinal direction of the heat exchanger from the first end to the second end and run at least essentially parallel to one another and are inclined to a horizontal plane with an angle of inclination between 0.5° and 5°,
wherein the first connection piece is arranged at a lowest point or at least near the lowest point of the first distributor and the second connection piece is arranged at a lowest point or at least near the lowest point of the second distributor, selecting an operating mode for the heat exchanger assembly depending on ambient parameters, the operating mode being selected from the group consisting of a recooling mode, an emptying mode, a filling mode and a standby mode, wherein when the emptying mode is selected, the fluid flows by gravity out of all of the pipelines into the first distributor and the second distributor and thereafter from the first distributor and the second distributor via the first and the second connection piece into the first fluid line and the second fluid line, and wherein when the filling mode is selected, the fluid flows against gravity out of the first distributor and the second distributor into the pipelines.

2. The method of claim 1, wherein on the first distributor and/or on the second distributor a third connection piece is arranged at a highest point or at least near the highest point of the respective distributor, and wherein the vent opening is arranged at a highest point or at least near the highest point of the first deflection distributor, further comprising using the vent opening for pressure equalization with the environment.

3. The method of claim 2, further comprising introducing the fluid in the recooling mode into the heat exchanger assembly via the first connection piece at the lowest point or at least near the lowest point of the first distributor and discharging the fluid via the third connection piece at the highest point or at least near the highest point of the second distributor.

4. The method of claim 1, further comprising operating the heat exchanger assembly in the standby mode after the emptying mode, in which the pipelines are at least substantially empty.

5. The method of claim 1, further comprising switching the operating modes of the heat exchanger assembly by actuation of valves of the heat exchanger assembly.

6. The method of claim 5, wherein the switching of the operating modes is performed by electrically controlling the valves.

7. A method for operating a heat exchanger assembly having at least one heat exchanger, which comprises a first distributor having a first connection piece for connecting to a first fluid line, a second distributor having a second connection piece for connecting to a second fluid line, at least one first deflection distributor, and a plurality of pipelines adapted for a fluid to flow therethrough, wherein the first distributor and the second distributor are arranged at a first end of the heat exchanger assembly and the deflection distributor is arranged at a second end thereof and the pipelines extend from the first end to the second end, and wherein the first connection piece is arranged at a lowest point or at least near the lowest point of the first distributor and the second connection piece is arranged at a lowest point or at least near the lowest point of the second distributor, the method comprising selecting an operating mode selected from the group consisting of a recooling mode, an emptying mode, a filling mode and a standby mode for the heat exchanger assembly depending on ambient parameters selected from the group consisting of outside temperature, wind speed and inlet temperature of the fluid on entering the heat exchanger assembly, detecting one or more of the ambient parameters by sensors and transferring the detected one or more ambient parameters as measured values to a control device, and calculating in the control device an outlet temperature of the fluid as it exits the heat exchanger assembly based on the detected measured values.

8. The method of claim 7, further comprising operating, by the control device, the heat exchanger assembly in the recooling mode as long as the calculated outlet temperature is greater than or equal to a predetermined limit value and switching the heat exchanger assembly to the emptying mode when the calculated outlet temperature is below the limit value.

9. The method of claim 7, further comprising switching, by the control device, the heat exchanger assembly from the standby mode to filling mode as soon as the calculated outlet temperature is greater than or equal to a predetermined limit value.

10. The method of claim 7, wherein the predetermined limit value is greater than 0° C.

11. The method of claim 7, wherein the predefined limit value is determined as a function of the thermal capacity of the heat exchanger assembly.

12. The method of claim 7, wherein the heat exchanger assembly comprises a plurality of heat exchangers which are each controlled by the control device and adapted for independent operation, further comprising controlling, by the control device, one or more of the plurality of heat exchangers to operate in the recooling mode as a function of the detected ambient parameters and/or the detected inlet temperature of the fluid.

13. The method of claim 12, wherein the fluid volume conducted through the heat exchanger assembly per unit of time remains the same regardless of the number of heat exchangers operated in the recooling mode.

* * * * *